(12) United States Patent
Baratzadeh et al.

(10) Patent No.: US 10,014,705 B2
(45) Date of Patent: Jul. 3, 2018

(54) SIGNAL QUALITY DEPENDENT THROTTLING OF DEVICES FOR REDUCING ELECTROMAGNETIC INTERFERENCE

(71) Applicant: Apple Inc., Cupertino, CA (US)

(72) Inventors: Kiavash Baratzadeh, Campbell, CA (US); Ruben Caballero, San Jose, CA (US); Jaydeep V. Ranade, Cupertino, CA (US); Matthew C. Robbins, Los Altos, CA (US); Orbay Tuncay, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 15/085,955

(22) Filed: Mar. 30, 2016

(65) Prior Publication Data

US 2016/0295427 A1 Oct. 6, 2016

Related U.S. Application Data

(60) Provisional application No. 62/142,381, filed on Apr. 2, 2015.

(51) Int. Cl.
*H02J 7/00* (2006.01)

(52) U.S. Cl.
CPC ..... *H02J 7/0052* (2013.01); *H02J 2007/0096* (2013.01)

(58) Field of Classification Search
CPC ................ H02J 2007/0096; H02J 7/0052
See application file for complete search history.

(56) References Cited

U.S. PATENT DOCUMENTS 6,229,997 B1 * 5/2001 Addy .................. H04B 1/1027
455/1
7,504,802 B2 3/2009 Bersenev
(Continued)

FOREIGN PATENT DOCUMENTS

EP 2562939 A2 2/2013
GB 2285187 A 6/1995
(Continued)

OTHER PUBLICATIONS

European Patent Application No. 1605409.0—Search and Examination Report dated Oct. 3, 2016.

*Primary Examiner* — Lewis West
(74) *Attorney, Agent, or Firm* — Kilpatrick Townsend & Stockton (57) ABSTRACT

This disclosure relates to systems, methods, and apparatus for limiting or throttling an activity of an accessory device communicatively coupled to a computing device. The activity of the accessory device is limited or throttled in order to reduce electromagnetic interference and improve signal quality of a wireless communication in which the computing device is participating. In some embodiments, a decision to throttle can be based on battery charge level of the computing device. For example, in some embodiments, the accessory device is an accessory battery charger configured to provide power to the computing device when a power outlet is not immediately available. If the signal quality of a phone call from the computing device is diminished or the user is in an area of low signal coverage, the accessory battery charger can be limited or throttled in order to prevent interference between the accessory battery charger and computing device.

19 Claims, 8 Drawing Sheets

(56) References Cited

U.S. PATENT DOCUMENTS

| | | |
|---|---|---|
| 8,412,105 B2 | 4/2013 | Dorsey et al. |
| 8,811,929 B2 | 8/2014 | Hendrix et al. |
| 2004/0247993 A1 | 12/2004 | Johnson et al. |
| 2007/0015476 A1 | 1/2007 | Akbar Attar et al. |
| 2008/0107288 A1 | 5/2008 | Chen |
| 2008/0194286 A1 | 8/2008 | Chen et al. |
| 2009/0233553 A1 | 9/2009 | Dai Javad |
| 2009/0295230 A1 | 12/2009 | Rousu et al. |
| 2011/0033073 A1* | 2/2011 | Inoshita ............... H04R 25/552 381/323 |
| 2011/0160809 A1* | 6/2011 | Cox ...................... A61N 1/025 607/63 |
| 2013/0016624 A1 | 1/2013 | Li et al. |
| 2014/0253015 A1* | 9/2014 | Lu ........................ H02J 7/0054 320/103 |
| 2016/0036497 A1* | 2/2016 | Tavakoli Shiraji .. H04B 5/0037 455/41.1 |
| 2016/0087485 A1 | 3/2016 | Maeda et al. |
| 2016/0164322 A1* | 6/2016 | Li ........................... H02J 7/00 320/137 |

FOREIGN PATENT DOCUMENTS

| | | |
|---|---|---|
| JP | 2013172443 A | 9/2013 |
| WO | 2010093969 A2 | 8/2010 |

\* cited by examiner

|  | | |
|---|---|---|
| SIGNAL QUALITY HIGH | PERMIT ACCESSORY DEVICE ACTIVITY | PERMIT ACCESSORY DEVICE ACTIVITY |
| SIGNAL QUALITY LOW | OPTIONALLY LIMIT OR PERMIT ACCESSORY DEVICE ACTIVITY | LIMIT ACCESSORY DEVICE ACTIVITY |
|  | BATTERY CHARGE LOW | BATTERY CHARGE HIGH |

SIGNAL QUALITY DEPENDENT THROTTLING OF DEVICES FOR REDUCING ELECTROMAGNETIC INTERFERENCE

CROSS-REFERENCE TO RELATED APPLICATION

The present application claims the benefit of U.S. Provisional Application No. 62/142,381, entitled "SIGNAL QUALITY DEPENDENT THROTTLING OF DEVICES FOR REDUCING ELECTROMAGNETIC INTERFERENCE," filed Apr. 2, 2015, the content of which is incorporated herein by reference in its entirety for all purposes.

FIELD

The present disclosure relates generally to improving signal quality of a wireless communication occurring at a computing device. More specifically, the present embodiments relate to limiting the activity of an accessory device coupled to the computing device based on the signal quality of the wireless communication to reduce electromagnetic interference.

BACKGROUND

The ability of various types of computing devices to communicate wirelessly has continued to improve as device components have become more advanced. Improvements including the coverage of wireless networks and the speed of individual processors have created a world in which the transmission of information at any time to anyone on the planet is possible. Although such improvements appear to be seamless when executed by the average consumer, the transmission of information over a network can be complicated. For example, because wireless signals are essentially electromagnetic fields oscillating at high frequencies, they are susceptible to interference by devices that generate electromagnetic waves. Interference can degrade signal quality and affect a user's experience when making phone calls or browsing the internet. Many components and algorithms are available to improve the handling of interference but often times these fall short of resolving signal quality issues.

SUMMARY

This paper describes various embodiments that relate to systems, methods, and apparatus for limiting the activity of an accessory device communicatively coupled to a computing device in order to reduce electromagnetic interference and improve signal quality. In some embodiments, a method is set forth for maintaining at least a threshold quality of service (QOS) for a wireless a communication conducted by a wireless circuit in a mobile device. The mobile device can be operatively coupled to an electronic accessory device comprising a circuit capable of generating electromagnetic interference (EMI) that adversely affects a QOS of the wireless communication. The method can include steps of determining the QOS for the wireless communication conducted by the wireless circuit, and sending a throttling signal to the circuit of the electronic accessory device when the QOS is less than the threshold QOS. As a result, the throttling signal can cause the circuit to reduce an amount of EMI generated. The electronic accessory device can include an auxiliary power supply comprising an accessory battery and a charging circuit coupled to the accessory battery and arranged to provide a charging current. The method can further include a step of determining a state of charge (SOC) of a battery of the mobile device. When the SOC of the battery is at or above a threshold SOC and the QOS is less than the threshold QOS, the throttling signal can be used to reduce activity of the charging circuit thereby reducing the amount of EMI generated and improving the QOS.

In other embodiments, a computing device is set forth. The computing device can include a processor and a memory configured to store instructions that when executed by the processor cause the computing device to perform steps that include determining a signal quality of a wireless communication and determining a state of charge of a battery of the mobile device. When the state of charge of the battery is at or above a threshold state of charge and the signal quality is below a signal quality threshold, an activity of a charging accessory communicatively coupled to the computing device can be limited. As a result of limiting the activity, interference between the charging accessory and the wireless communication is reduced.

In yet other embodiments, a mobile device is set forth. The mobile device can include a wireless circuit, a processor, and a memory configured to store instructions that when executed by the processor cause the mobile device to perform steps that include determining signal quality of a wireless communication conducted by the wireless circuit. The steps can further include a step of limiting an activity of an accessory device communicatively coupled to the mobile device when the signal quality is at or below a signal quality threshold, wherein limiting the activity reduces electromagnetic interference resulting from the activity. In some embodiments, the degree of limitation of the activity is based on which mode of a plurality of modes the mobile device is operating in. Additionally, in some embodiments, the accessory device is internal or external to the mobile device. Furthermore, the activity can correspond to sending a data signal or a charge signal to the mobile device, and a degree of limitation on the activity can be based on a state of the activity. For example, when the activity includes sending the charge signal, the status of the activity can be a state of charge of a battery in the mobile device relative to a charge threshold.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments discussed herein relate to improving a user experience related to wireless transmissions occurring at a computing device. Because wireless transmissions rely on electromagnetic waves to transmit signals, wireless transmissions can be susceptible to interference from accessory devices that generate electromagnetic waves. In order to reduce sensitivity to such interference, selected operations of the accessory device can be limited by the computing device in order to mitigate and/or prevent interference. In some embodiments discussed herein, the extent by which the accessory device is limited can be based at least on signal quality and/or quality of service (QOS) of the wireless transmission. Specifically with regards to cellular telephony, signal quality and/or QOS can be based on one or more signal metrics not limited to any of the following: a received signal strength indicator (RSSI), received channel power indicator (RCPI), received signal code power (RSCP), reference signal received quality (RSRQ), signal-to-noise ratio (SNR), signal-to-interference plus noise ratio (SINR), interference, or any other suitable metric indicative of signal quality. The signal quality of the wireless signal can be monitored when the computing device is communicating with a remote computing device or component via the wireless signal. Based on the monitoring, the computing device can determine whether the signal quality of the wireless signal is within a signal quality threshold corresponding to one or more of the signal metrics. The signal quality threshold can be a single value or a range of values that define a scope of signal quality set by the computing device or a user. Signal quality values that fall within the signal quality threshold can correspond to wireless transmissions sent or received with minimal or no errors, discrepancies, and/or impact on a user's experience. If a signal quality value is not within the signal quality threshold, selected operations of the accessory device can be limited or throttled by the computing device. For example, if certain operations of the accessory device generate or rely on an electromagnetic field, throttling such operations by the accessory device can reduce interference between the electromagnetic field generated by the accessory device and the wireless signal, thereby improving the signal quality, and the overall user experience.

In some embodiments, the computing device is a mobile device and the accessory device is an auxiliary power supply. The auxiliary power supply can be a portable power supply that can include one or more batteries and a charging circuit for providing a charging current to a battery of the mobile device. During normal operation of the auxiliary power supply, the auxiliary power supply can generate an extrinsic electromagnetic field that can interfere with the reception and/or transmission of a wireless communication associated with wireless circuitry in the mobile device. As a result, certain functions of the mobile device, such as phone calls and data transmissions, can be negatively affected by the interference. However, depending on the amount of charge remaining in the battery of the mobile device, the interference can be reduced by limiting the activity of those aspects of the auxiliary power supply responsible for the interference. For example, during charging of the mobile device battery from the auxiliary power supply, the computing device can determine that signal quality of a phone call or other data transmission is not within the signal quality threshold. As a result, and if the amount of charge remaining in the mobile device battery (i.e., mobile device charge) is at or above a charge threshold, charging of the mobile device battery by the auxiliary power supply can be throttled or limited to reduce the interference. Additionally, if the mobile device charge is not at or above the charge threshold, the auxiliary power supply will be permitted to continue charging the battery of the mobile device despite any interference occurring as a result of the charging.

In some embodiments, a user may be provided the option to either limit or not limit the activity of the auxiliary power supply before or during a phone call or data transfer. For example, in order to improve signal quality, the user can choose to limit the activity of the auxiliary power supply if the user is conducting an important phone call or sending important data to a remote device and signal quality is low. Additionally, in some embodiments, the user is not given an option regarding whether to limit the activity of the auxiliary power supply to improve signal quality. This embodiment is useful for preventing harm to the mobile device when the mobile device charge becomes too low during a phone call or data transmission. In this embodiment, should the mobile device charge fall to a low threshold (e.g., one that is equal to or below the charge threshold), the auxiliary power supply will continue charging the mobile device battery regardless of whether the charging is affecting the signal quality. In yet other embodiments, limitations on the accessory device can depend on a mode in which the computing device is operating. In one embodiment, the limitations can be embodied as one or more lookup tables stored in a memory of the computing device, and/or a hierarchy that defines when and how to limit one or more accessory devices.

These and other embodiments are discussed below with reference to FIGS. 1-8; however, those skilled in the art will readily appreciate that the detailed description given herein with respect to these figures is for explanatory purposes only and should not be construed as limiting.

Figure 1:
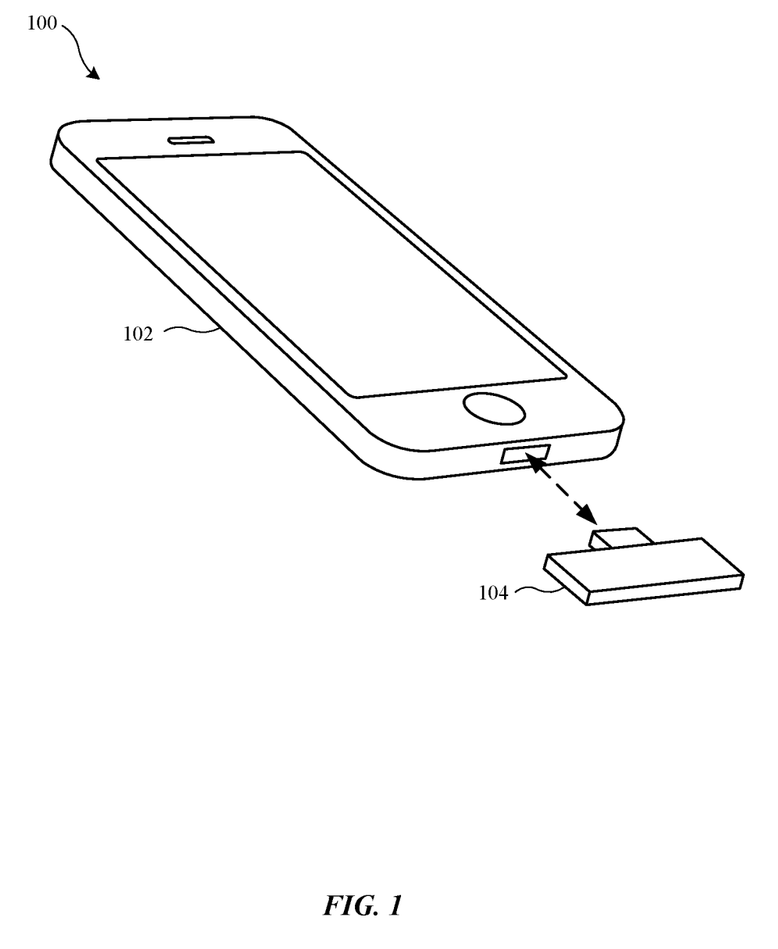
FIG. 1 is a perspective view of a computing device and an accessory device according to some embodiments discussed herein.

FIG. 1 is a perspective view 100 of a computing device 102 and an accessory device 104 according to some embodiments discussed herein. The computing device 102 can be any type of computing device capable of sending and/or receiving wireless communications. For example, the computing device 102 can be a desktop computer, media player, cellular phone, remote control, tablet computer, laptop computer, or any other device having wireless communication capabilities. The accessory device 104 can be any accessory device capable of directly or indirectly causing electromagnetic interference with a wireless communication occurring at the computing device 102. Although the accessory device 104 is illustrated as being external to the computing device 102, the accessory device 104 can be an internal device or component of the computing device 102. The accessory device 104 can be an accessory battery charger configured to provide charge to a battery of the computing device 102. The accessory battery charger can cause electromagnetic interference with wireless communications occurring at the computing device 102, thereby affecting the quality of the wireless communications. For example, when a user of the computing device 102 is conducting a phone call and the battery becomes low, the user may plug in the accessory device 104 to the computing device 102 in order to charge the battery. As a result, the signal quality of the wireless communication can be diminished by the charging of the battery, thereby degrading the clarity of the phone call. Such degradation can occur in part because of switches that convert power from the accessory device 104 to usable power in the computing device 102. The embodiments discussed herein can be included in the computing device 102 or accessory device 104 in order to preserve signal quality during use of the accessory device 104. For example, and according to some embodiments, when the signal quality of a wireless communication (e.g., a phone call, data transfer) is determined to be not within a signal quality threshold, an activity of the accessory device 104 (e.g., outputting current or voltage, and/or sending and/or receiving data) can be limited or throttled by the accessory device 104 or computing device 102.

Figure 2:
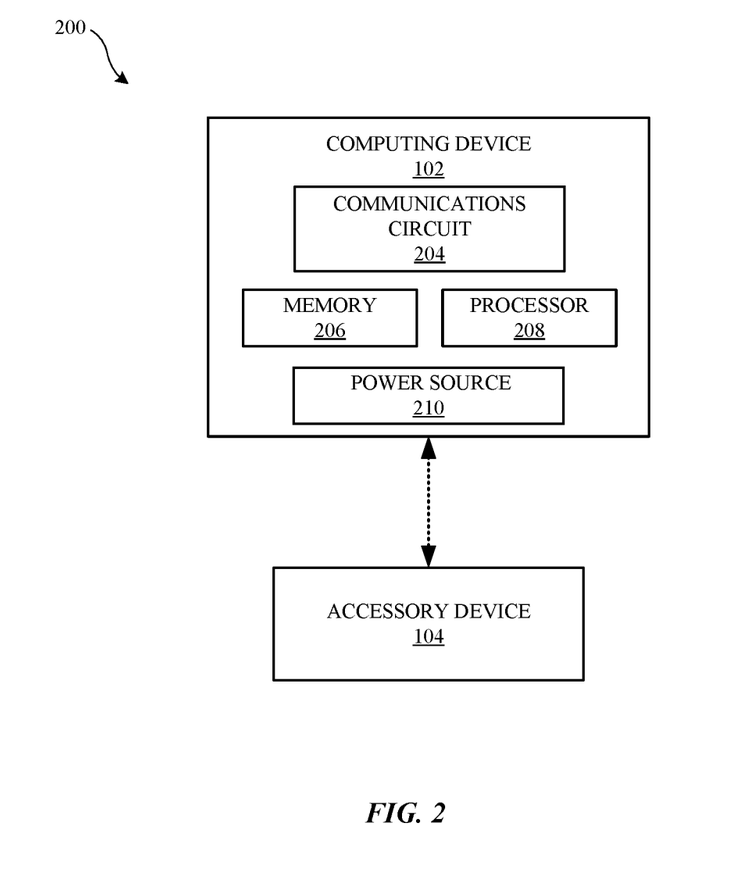
FIG. 2 is a block diagram of the computing device and the accessory device according to some embodiments discussed herein.

FIG. 2 is a block diagram 200 of the computing device 102 and an accessory device 104 according to some embodiments. The computing device 102 can include a communications circuit 204 for sending and/or receiving wireless communications. The wireless communications can correspond to a phone call, data transfer, control signal, payment transaction or transmission of a wireless signal. The computing device 102 can further include a processor 208 and a memory 206, which enable various features of the computing device 102, and can control the communications circuit 204. In some embodiments, the processor 208 can determine signal quality of a wireless communication that the computing device 102 is participating in. The computing device 102 can determine that the signal quality is not within the signal quality threshold, or otherwise not normal or optimal for a certain type of wireless communication. For example, signal quality that is not within the signal quality threshold can result in a phone call being at least partially unclear or inaudible. Additionally, signal quality that is not within the signal quality threshold can result a data transfer to be inaccurately received by a remote device, or be received with errors. The signal quality threshold can be defined by a value or range of values corresponding to one or more metrics of signal quality. For example, when the metric indicating signal quality is RSSI, the signal quality threshold can be any value above −80 dBm (e.g., −70 dBm). Additionally, when the metric indicating signal quality is interference or noise, the signal quality threshold can be any value below −80 dBm (e.g., −100 dBm). However, these ranges and metrics can be modified in any suitable manner for optimizing signal quality. In some embodiments, the signal quality threshold can be different for each mode. For example, the signal quality threshold can depend on whether the communications circuit 204 is conducting a phone call or sending data over a data network. Furthermore, the signal quality threshold can depend on whether the communications circuit 204 is idle, or actively and consistently operating over one or more channels (e.g., in a dedicated channel (DCH) mode). For example, the communications circuit 204 can be less sensitive in an idle mode and therefore the signal quality threshold in the idle mode can include different values compared to those of a non-idle mode.

Using the determined signal quality, the computing device 102 can perform a variety of functions to improve the signal quality. For example, the computing device 102 can limit one or more functions of the accessory device 104 based on the signal quality. The accessory device 104 can by any suitable accessory device capable of causing EMI as a result of an activity of the accessory device 104. For example, the accessory device 104 can be a device capable of sending data to the computing device 102, and/or receiving data from the computing device 102. In embodiments where the accessory device 104 is an accessory battery charger, the computing device 102 can limit or throttle a current output of the accessory battery charger. In this way, current provided from a power source of the accessory device 104 will be limited or stopped by the computing device 102. In some embodiments, the limiting and/or throttling of the accessory device 104 can be performed within the computing device 102 by limiting and/or throttling an input provided from the accessory device 104. In other embodiments, the computing device 102 can effectuate limiting and/or throttling of the accessory device 104 by sending a signal to the accessory device 104. The signal can limit or throttle the accessory device 104 as long as the wireless communication is occurring at the computing device 102 or briefly during a wireless communication occurring at the computing device 102. In some embodiments, the signal can limit or throttle the accessory device 104 until the signal quality is within the signal quality threshold.

The limiting and/or throttling of the activity of the accessory device 104 can be based on one or more values indicative signal quality measured over time. For example, the processor 208 can sample signal quality of the communications circuit 204 and cause the activity of the accessory device 104 to be limited or throttled based on a running average of signal quality measured over a period of time. In some embodiments, the limiting and/or throttling of the activity of the accessory device 104 can be based on one or more lookup tables stored in a memory 206 of the computing device 102 and/or a memory of the accessory device 104. For example, a lookup table can contain multiple values corresponding to a range of values for signal quality, and each value of the multiple values can be associated with one or more limits to be applied to the accessory device 104. In some embodiments, a lowest or poorest value of signal quality can be associated with a complete restriction of activity of the accessory device 104. In this way, if the signal quality measured at the communications circuit 204 corresponds to the lowest or poorest value in the lookup table, the computing device 102 will cause the accessory device 104 to completely stop an activity (e.g., preventing charging of the power source 210 and/or stopping the sending or receiving of data at the accessory device 104). In some embodiments, an optimal value of signal quality in the lookup table can be associated with a non-limiting value in the lookup table. In this way, when the signal quality is optimal, no limit on activity will be applied to the accessory device 104.

In embodiments where the accessory device 104 is an accessory battery charger, a lookup table can be stored in memory 206 and include values corresponding to a state of charge of the power source 210. The values can be organized as ranges such that an upper range corresponds to a sufficient charge level for conducting the wireless communication, and a lower range corresponds to a non-sufficient charge level for conducting the wireless communication. Each range and/or each value in the lookup table can be associated with one or more limits to be applied to the accessory device 104. Additionally, each limit can be associated with a value or range of values indicative of signal quality. In this way, a limit can be applied to an activity of the accessory device 104 based at least on charge level of the power source 210 and signal quality of a wireless communication of the communications circuit 204. For example, when the power source 210 (e.g., a battery) has a state of charge that is at or above a charge threshold, but the signal quality is not within the signal quality threshold, the computing device 102 can limit an input from the accessory device 104. When the power source 210 does not have a state of charge that is at or above the charge threshold and the signal quality is not within the signal quality threshold, the computing device 102 can prompt a user to choose between continuing operations of the accessory device 104 or stopping an operation of the accessory device 104. However, in some embodiments, the accessory device 104 can be completely or partially limited without the user being prompted to make a choice.

Figure 3:
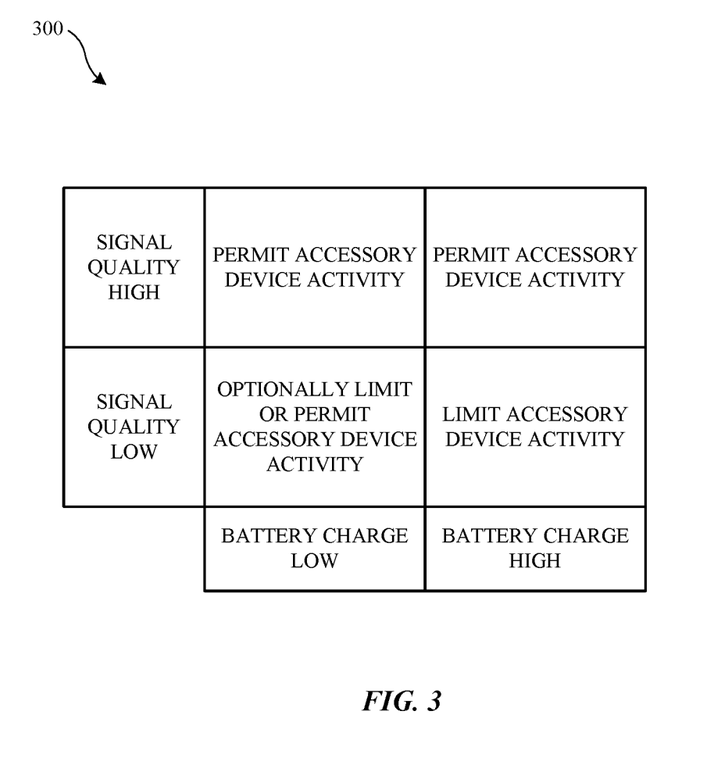
FIG. 3 is a table relating signal quality and battery charge for limiting an activity of the accessory device according to some embodiments discussed herein.

FIG. 3 is a table 300 relating signal quality and battery charge for limiting an activity of an accessory device according to some embodiments discussed herein. The table 300 can be incorporated into computer code for the computing device 102 or the accessory device 104 to improve signal quality at the computing device 102. The table 300 includes instructions to permit the activity of the accessory device 104 when signal quality is high (i.e., within the signal quality threshold) and battery charge is either low or high (i.e., below or above a charge threshold). In this way, when the accessory device 104 is an accessory battery charger, the accessory battery charger is able to charge a battery of computing device 102 as long the signal quality is high. When the battery charge is high and the signal quality is low, the computing device 102 can limit an activity of the accessory device 104 in order to prevent any interference being caused by the accessory device 104. When the signal quality is low and the battery charge is low, the computing device 102 can either limit the activity of the accessory device 104 (e.g., allow some current or input to the computing device) or not limit the activity of the accessory device 104. For example, when signal quality is low and battery charge is low, the user may be prompted to choose whether to limit or not limit an activity of the accessory device. In some embodiments, the computing device 102 or accessory device 104 is programmed to either limit or permit an activity of the accessory device 104 when the signal quality and battery charge is low, without giving the user an option between the two.

The activity of the accessory device 104 can be one or multiple activities of a device or component internal or external to the computing device 102. For example, in some embodiments, the accessory device 104 is an internal component such as a speaker, display panel, camera, microphone, antenna, switch, touch screen, light, sensor, or any other internal component of a computing device. Additionally, in some embodiments, a hierarchy can be stored in the memory 206. The hierarchy can define when and/or how to limit or throttle one or more internal components and/or external components. For example, when the signal quality is not within the signal quality threshold, the hierarchy can provide instructions to limit an activity of an external accessory device before limiting an activity of an internal accessory device. Moreover, the hierarchy can include instructions to limit an activity of an internal accessory device before limiting an activity of an external accessory device. In some embodiments, the hierarchy can include instructions to limit one or more internal accessory devices before one or more other external accessory devices. For example, when signal quality is low, the processor 208 can cause a display panel of the computing device 102 to have a reduced output and thereafter cause a camera of the computing device 102 to be turned off. It should be noted that any suitable hierarchy for ordering the throttling or limiting of activity of one or more components is within the scope of this disclosure.

Figure 4:
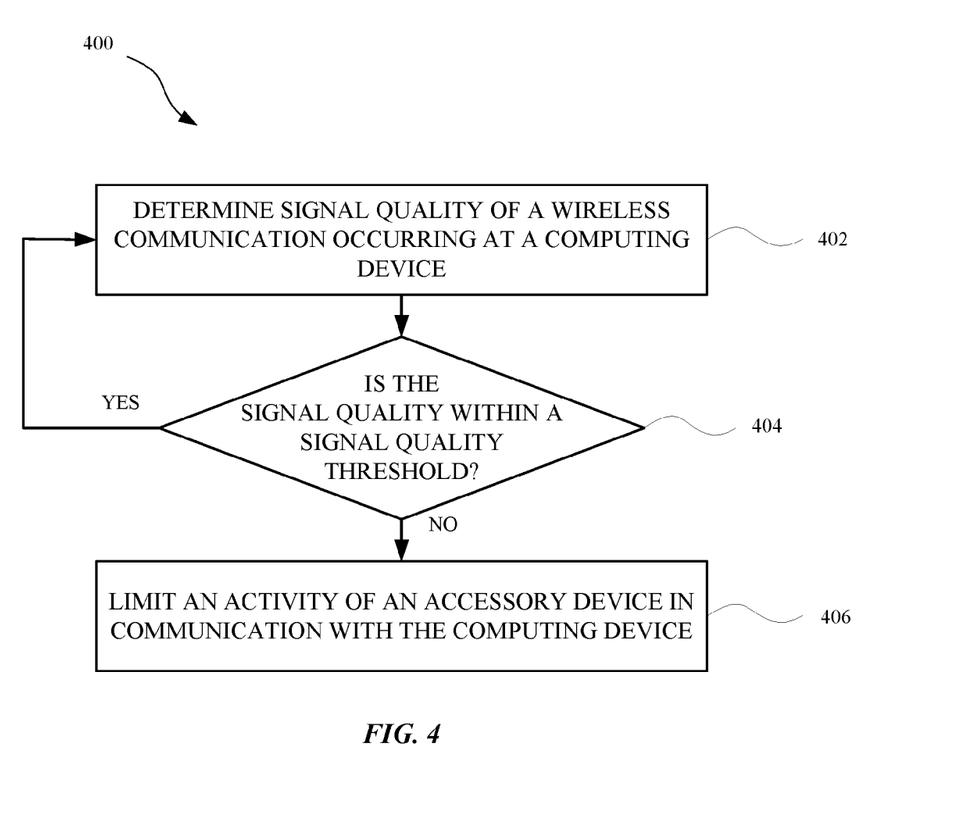
FIG. 4 sets forth a method for limiting the activity of the accessory device based on signal quality experienced by the computing device.

FIG. 4 sets forth a method 400 for limiting the activity of an accessory device based on signal quality experienced by the computing device 102. The method 400 can be performed by computing device 102 and/or accessory device 104, or any other suitable device or module capable of controlling an accessory device. The method 400 includes a step 402 of determining signal quality of a wireless communication occurring at the computing device 102. The wireless communication can correspond to a phone call, video call, data upload or download, or any other wireless communication. At step 404, a determination is made whether the signal quality is within the signal quality threshold. The signal quality threshold can define a point when the signal quality is normal or optimal, or when a metric of signal quality has reached a certain value or range of values. If the signal quality is determined to not be within the signal quality threshold, then, at step 406, an activity of an accessory device in communication with the computing device is limited by the computing device. However, if the signal quality is determined to be within the signal quality threshold, step 402 is repeated. The accessory device can be any accessory device that can potentially cause interference with the wireless communication occurring at the computing device. For example, the accessory device can be a hard-wired or wireless power supply communicatively coupled to the computing device such that the computing device can control the activity of the power supply according to method 400. In some embodiments, the signal quality is communicated to the accessory device, allowing the accessory device to control its activity based on the received signal quality from the computing device. Additionally, in some embodiments, the accessory device is internal to the computing device. For example, an internal accessory device can be a display circuit, near field communications circuit, camera circuit, touch sensor circuit, processor circuit, memory circuit, or any other suitable component or subsystem of the computing device capable of directly or indirectly generating electromagnetic interference.

Figure 5:
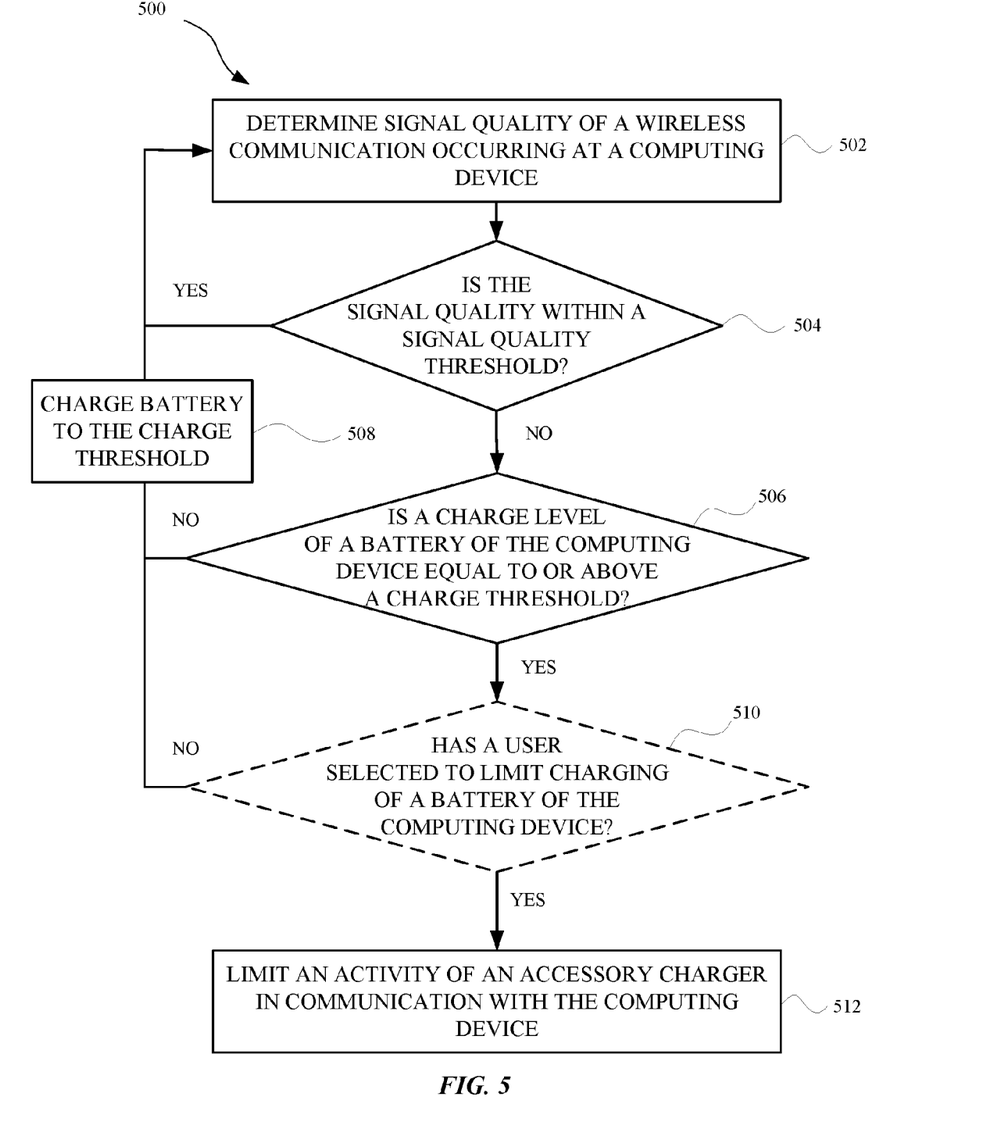
FIG. 5 sets forth a method for limiting the activity of an accessory charger in communication with a computing device.

FIG. 5 is a method 500 for limiting the activity of an accessory charger in communication with a computing device. The method 500 can be performed by computing device 102 or accessory device 104, or any other suitable component or software module. The method 500 includes a step 502 of determining signal quality of a wireless communication occurring at the computing device. At step 504, a determination is made whether the signal quality is within a signal quality threshold for the wireless communication. If the signal quality is within the signal quality threshold, then step 502 is repeated immediately or after a period of time has elapsed. If the signal quality is not within the signal quality threshold, then, at step 506, a determination is made whether a charge level of a battery of the computing device is equal to or above a charge threshold. The charge threshold can be set by the computing device or a user of the computing device. Additionally, the charge threshold can be dynamic and change based on any suitable parameter associated with battery charge (e.g., temperature, time since manufacturing of the battery). When the charge level of the battery is not equal to or above the charge threshold, then, at step 508, the battery is charged from the accessory charger. When the charge level is less than the charge threshold (or equal to a low charge threshold), then, at step 510, the user is provided with the option to allow the accessory charger to continue charging the battery of the computing device or limit the charging in some way. If the user does not choose to limit the charging, then step 508 is repeated, otherwise step 512 is executed. However, it should be noted that step 510 is optional in some embodiments and can therefore be skipped in those embodiments.

At step 512, the activity of the accessory charger is throttled or limited by the computing device. For example, when the signal quality is not within the signal quality threshold and the charge level is less than the charge threshold, the computing device can cause the accessory charger to stop providing current to the computing device. In some embodiments, the computing device can cause the accessory charge to allow some charge to be provided to the computing device from the accessory charger. In other embodiments, the limitation applied to the accessory charge can change depending on a magnitude of deviation the signal quality is from the signal quality threshold. For example, a lookup table can be stored in the computing device to determine how much to limit the activity of the accessory charger. Multiple values for signal quality can be provided in the lookup table. Additionally, each value for signal quality can be associated with a limit on the amount of current or voltage that the accessory device can apply to charging a battery of the computing device. For example, a lowest value for signal quality in the lookup table can correspond to a limit on current that prevents any current from being supplied from the accessory charger to the battery of the computing device. A highest value for signal quality in the lookup table can correspond to a non-limiting value, thereby allowing the accessory charger to provide charge without a restriction based on signal quality. Furthermore, a middle value for signal quality in the lookup table can correspond to a partial-limit value for allowing the accessory charger to provide some charge to the battery of the computing device.

Figure 6:
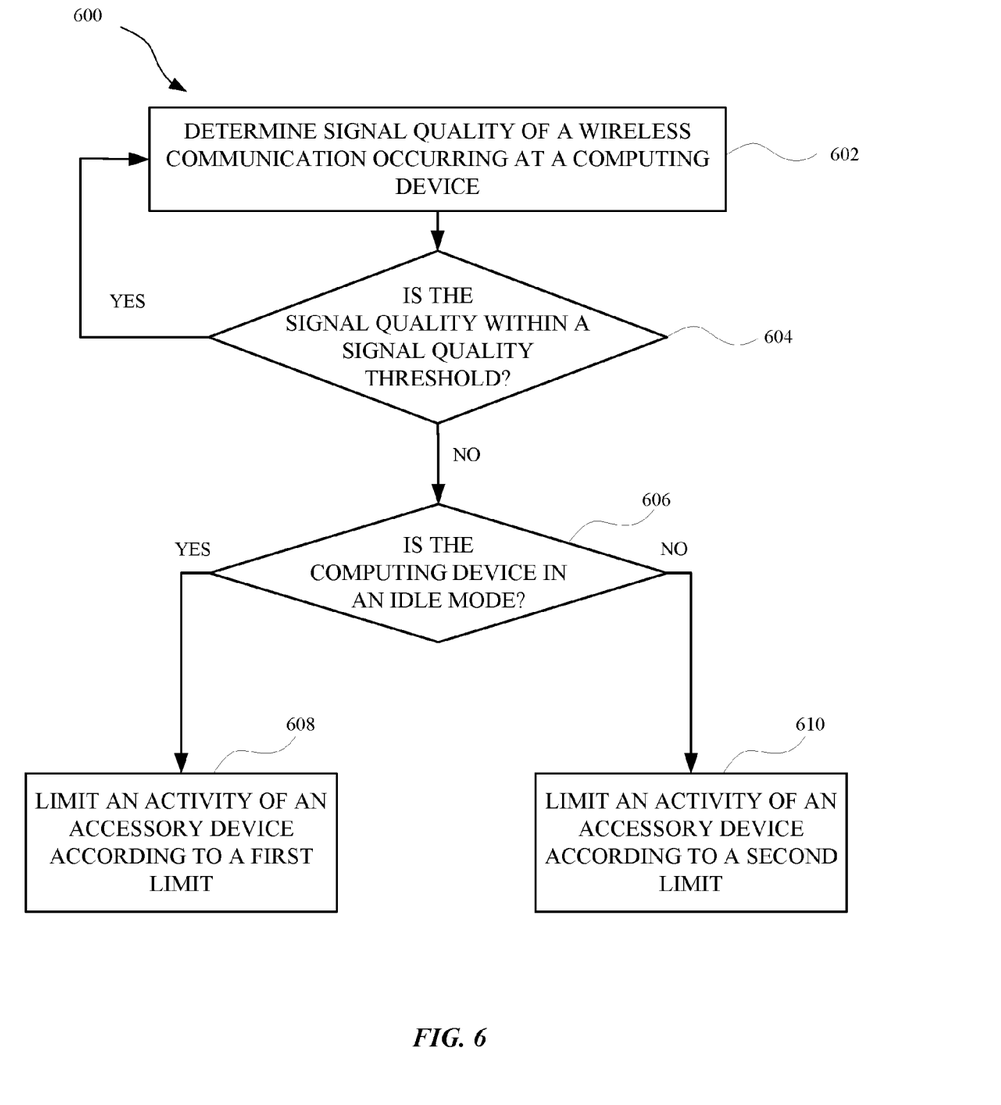
FIG. 6 sets forth a method of limiting an activity of an accessory device in communication with a computing device according to a mode of the computing device.

FIG. 6 illustrates a method 600 of limiting an activity of an accessory device in communication with a computing device according to a mode of the computing device. The method 600 can be performed by computing device 102 or accessory device 104, or any other suitable component or module. The method 600 includes a step 602 of determining signal quality of a wireless communication occurring at the computing device. At step 604, a determination is made whether the signal quality is within the signal quality threshold for the wireless communication. If the signal quality is within the signal quality threshold, then step 602 is repeated immediately or after a period of time has elapsed. If the signal quality is not within the signal quality threshold, then, at step 606, a determination is made whether the computing device is in an idle mode. Idle mode can refer to a mode where the computing device is inactive or less active than a normal operating mode. The idle mode can also refer to a mode where a communications channel of the computing device is inactive or less active than a non-idle operating mode. For example, the idle mode can refer to a mode where a communications circuit is not actively or consistently sending or receiving data (e.g., a paging channel (PCH) mode). The normal operating mode can refer to a direct channel (DCH) mode, forward access channel (FACH) mode, or any other mode where the communications circuit is actively or consistently sending or receiving data. An activity of an accessory device in communication with the computing device can be limited differently based on whether or not the computing device is in the idle mode. In some embodiments, the activity of the accessory device can be limited differently based on whether or not the wireless communication is occurring within a certain frequency band or range of frequency bands. Therefore, in some embodiments, step 606 can be a step of determining whether the wireless communication is occurring at a certain frequency or range of frequencies.

According to the method 600, if the computing device is in the idle mode then, at step 608, the activity of the accessory device is limited according to a first limit. However, if the computing device is in not in the idle mode then, at step 610, the activity of the accessory device is limited according to a second limit. In some embodiments, the first limit can be less limiting than the second limit, and in other embodiments the first limit can be more limiting than the second limit. For example, when in the idle mode the computing device can be less susceptible to electromagnetic interference because an antenna of the computing device is less sensitive in the idle mode than a non-idle mode. Therefore, fewer limitations on the activity of the accessory device would be necessary to improve signal quality because the antenna is less affected by the accessory device when the computing device is in the idle mode. In some embodiments, more limits than a first and second limit are used to improve signal quality and limit an activity of the accessory device.

In some embodiments, the limit used can depend on a lookup table stored in a memory of the computing device and/or the accessory device. In this way, a limitation applied to an accessory device for a specific limit can be correlated to one or more values in one or more lookup tables. For example, if the first limit is to be executed, a software module responsible for limiting the activity of the accessory device can access a lookup table for the first limit. Using the signal quality, the module can find by how much to limit the activity based on a correspondence between the signal quality and a limiting value (e.g., a percentage value, decimal value, or any other suitable table value for defining a limitation on the activity) in the lookup table. For example, if the signal quality is not within the signal quality threshold, the limiting value in the first limit can be 50% or any other suitable value indicating that the activity of the accessory device should be at least partially limited. If the second limit is to be executed, the software module can access the same or a different lookup table for the second limit. For example, when the signal quality is not within the signal quality threshold, the limiting value in the second limit can be 100% or any other suitable value indicating that the activity of the accessory device should be completely limited or throttled.

In some embodiments, a lookup table is not used to determine how much to limit the activity of the accessory device for the first limit and second limit. Rather, in such embodiments, a logical statement is used to determine when to execute either the first limit or the second limit. For example, when the signal quality is within the signal quality threshold and the computing device is in an idle mode, the activity of the accessory device is limited by a first value (e.g., 20%, 0%, or any other suitable value). Furthermore, when the signal quality is not within the signal quality threshold and the computing device is not in the idle mode, the activity of the accessory device is limited by a second value (e.g., 50%, 100%, or any other suitable value).

Figure 7:
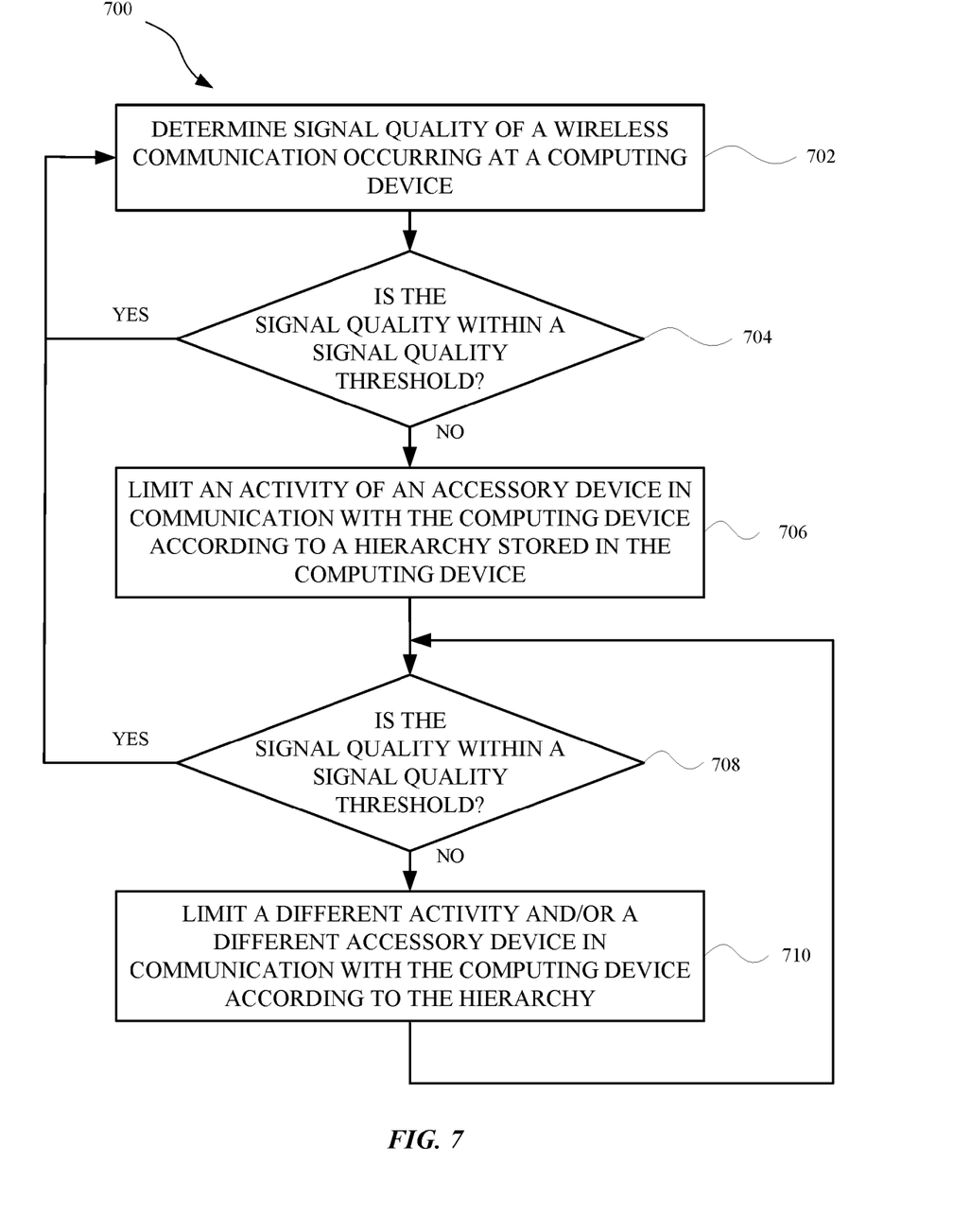
FIG. 7 sets forth a method of limiting the activity of one or more accessory devices in communication with a computing device according to a hierarchy.

FIG. 7 illustrates a method 700 of limiting the activity of one or more accessory devices in communication with a computing device according to a hierarchy. The hierarchy can be executed by the computing device to improve signal quality of a wireless communication in which the computing device is participating. The method 700 can be performed by computing device 102 or accessory device 104, or any other suitable component or software module. The method 700 includes a step 702 of determining signal quality of a wireless communication occurring at the computing device. At step 704, a determination is made whether the signal quality is within the signal quality threshold for the wireless communication. If the signal quality is within the signal quality threshold, then step 702 is repeated immediately or after a period of time has elapsed. If the signal quality is not within the signal quality threshold then, at step 706, an activity of an accessory device is limited according to a hierarchy stored on the computing device. The hierarchy can define an order of devices to be limited or throttled when the signal quality is not within the signal quality threshold. The hierarchy can be an array of data, lookup table, or other form of data that can be stored in a computing device to provide an ordered list of devices or activities to be limited or throttled. The activities can be include transmitting current, data, wireless signals, or any other related activity discussed herein that can potentially cause interference with the wireless communication.

At step 708, a determination is made whether signal quality is within the signal quality threshold. Step 708 can be performed immediately or after a period of time has elapsed from the execution of step 706. If the signal quality is within the signal quality threshold, then step 702 is repeated either immediately or after a period of time has elapsed. If the signal quality is not within the signal quality threshold, then, at step 710, a different activity and/or different accessory device in the hierarchy is limited or throttled in order to improve signal quality. In this way, a different activity or accessory device is limited or throttled each time step 710 is performed. Step 708 is repeated either immediately after or once a period of time has elapsed after step 710. In some embodiments, the hierarchy can include instructions to gradually limit the activity of one or more accessory devices. For example, the hierarchy can include instructions to gradually limit an output of a display device until the signal quality reaches the signal quality threshold. If the signal quality does not return to the signal quality threshold after the display device has been gradually limited, a different device in the hierarchy (e.g., a power supply, charging accessory, Bluetooth device, or any other suitable device or component) can be limited or throttled. These steps can be performed until the end of the hierarchy is reached or the signal quality of the wireless communication reaches the signal quality threshold. It should be noted that any of the methods, devices, and systems discussed herein can be combined in any manner to effectively improve signal quality of a wireless communication. For example, any of the methods discussed herein can include steps for limiting or throttling multiple different accessory devices and/or components. Furthermore, the throttling and limiting discussed in each method can be based on a hierarchy and/or lookup table stored in the computing device and/or accessory device.

In embodiments where a lookup table is used to throttle or limit activities of one or more accessory devices, each activity to be throttled or limited can be prioritized according to the lookup table. In this way, a manufacturer, user, or device can configure the lookup table to specify an order by which activities are throttled or limited. In some embodiments, the lookup table can include one or more values corresponding to a signal quality threshold. Each signal quality threshold in the lookup table can be associated with one or more activities and/or one or more accessory devices to be limited or throttled. When signal quality exhibited by a computing device connected to the accessory device reaches a signal quality threshold, the activity or activities corresponding to the signal quality threshold in the lookup table can be limited or throttled. Thereafter, if the signal quality changes and reaches another signal quality threshold, the activity or activities associated with the other signal quality threshold can be limited or throttled. Additionally, if the signal quality does not change after a predetermined period of time after limiting or throttling an activity, the lookup table can be referenced to determine the next activity and/or accessory device to be limited or throttled. In some embodiments, other thresholds associated with time and/or state of charge can similarly be provided in the lookup table. In this way, the limiting or throttling of an activity can be based on an amount of time that the signal quality exhibited by the computing device has been at a certain signal quality value. For example, a predetermined time delay can be enforced between a point when signal quality reaches a certain signal quality threshold and a point when an activity is limited or throttled. Furthermore, the limiting or throttling of an activity can be based on one or more state of charge thresholds in the lookup table. For example, an activity of an accessory device can be limited or throttled when signal quality reaches a signal quality threshold and/or a state of charge threshold stored in the lookup table. In some embodiments, the lookup table can be arranged such that a charging activity of an accessory device charger is throttled or limited first before any other accessory device activity is limited or throttled.

Figure 8:
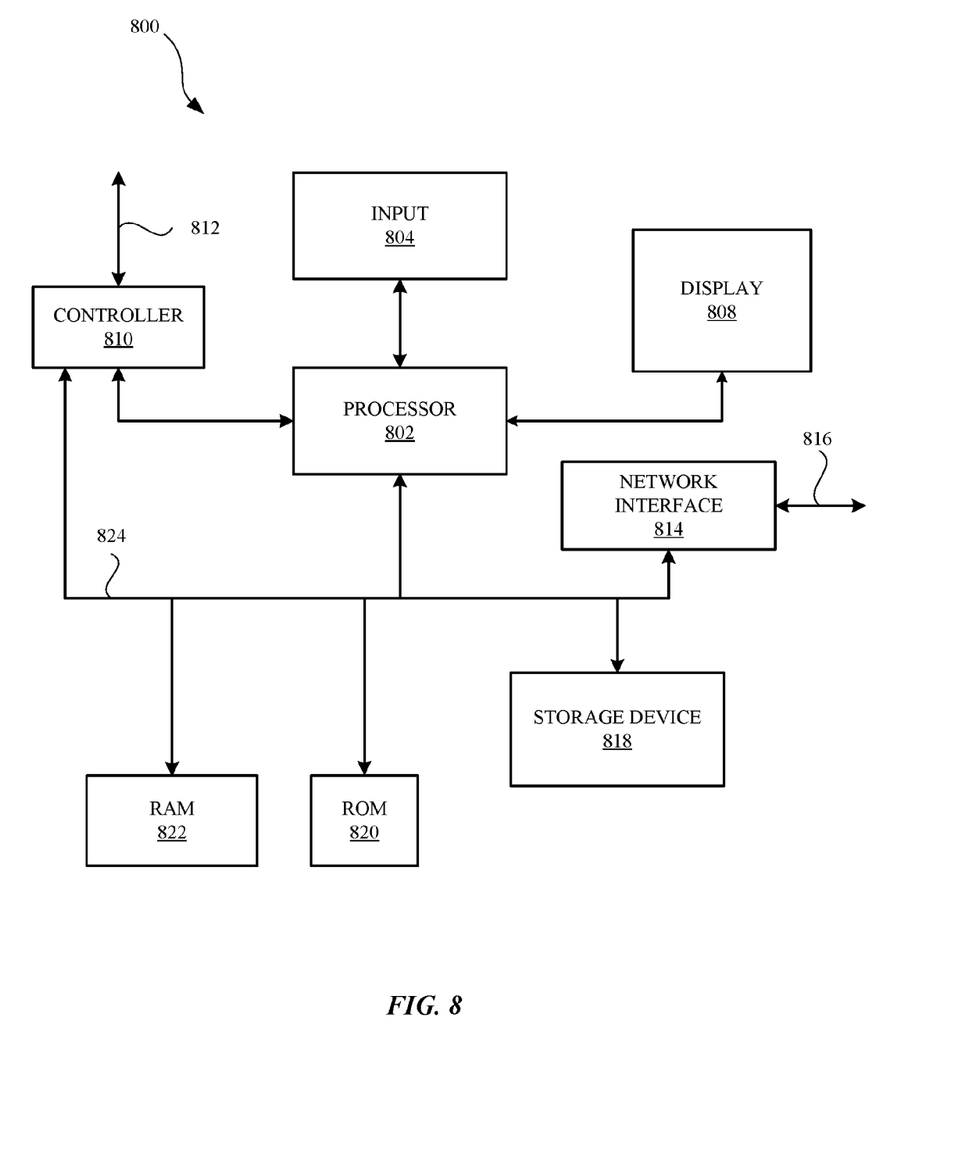
FIG. 8 illustrates a block diagram of a computing device for executing any of the embodiments discussed herein.

FIG. 8 is a block diagram of a computing device 800 that can represent the components of the computing device 102 and/or the accessory device 104, or any other suitable device or component for performing any of the methods discussed herein. It will be appreciated that the components, devices or elements illustrated in and described with respect to FIG. 8 may not be mandatory and thus some may be omitted in certain embodiments. The computing device 800 can include a processor 802 that represents a microprocessor, a coprocessor, circuitry and/or a controller for controlling the overall operation of computing device 800. Although illustrated as a single processor, it can be appreciated that the processor 802 can include a plurality of processors. The plurality of processors can be in operative communication with each other and can be collectively configured to perform one or more functionalities of the computing device 800 as described herein. In some embodiments, the processor 802 can be configured to execute instructions that can be stored at the computing device 800 and/or that can be otherwise accessible to the processor 802. As such, whether configured by hardware or by a combination of hardware and software, the processor 802 can be capable of performing operations and actions in accordance with embodiments described herein.

The computing device 800 can also include user input device 804 that allows a user of the computing device 800 to interact with the computing device 800. For example, user input device 804 can take a variety of forms, such as a button, keypad, dial, touch screen, audio input interface, visual/image capture input interface, input in the form of sensor data, etc. Still further, the computing device 800 can include a display 808 (screen display) that can be controlled by processor 802 to display information to a user. Controller 810 can be used to interface with and control different equipment through equipment control bus 812. The computing device 800 can also include a network/bus interface 814 that couples to data link 816. Data link 816 can allow the computing device 800 to couple to a host computer or to accessory devices. The data link 816 can be provided over a wired connection or a wireless connection. In the case of a wireless connection, network/bus interface 814 can include a wireless transceiver.

The computing device 800 can also include a storage device 818, which can have a single disk or a plurality of disks (e.g., hard drives) and a storage management module that manages one or more partitions (also referred to herein as "logical volumes") within the storage device 818. In some embodiments, the storage device 818 can include flash memory, semiconductor (solid state) memory or the like. Still further, the computing device 800 can include Read-Only Memory (ROM) 820 and Random Access Memory (RAM) 822. The ROM 820 can store programs, code, instructions, utilities or processes to be executed in a non-volatile manner. The RAM 822 can provide volatile data storage, and store instructions related to components of the storage management module that are configured to carry out the various techniques described herein. The computing device 800 can further include data bus 824. Data bus 824 can facilitate data and signal transfer between at least processor 802, controller 810, network interface 814, storage device 818, ROM 820, and RAM 822.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for maintaining at least a threshold quality of service (QOS) for a wireless communication conducted by wireless circuitry in a mobile device, wherein the mobile device is operatively coupled to a charging device comprising a circuit capable of generating electromagnetic interference (EMI) that adversely affects a QOS of the wireless communication, the method comprising:
at the mobile device:
determining the QOS for the wireless communication conducted by the wireless circuitry, wherein the wireless communication comprises a phone call or cellular data transmission;
determining a state of charge (SOC) of a battery of the mobile device; and
when the SOC of the battery is at or above a low-battery threshold SOC and the QOS is less than a threshold QOS, sending a throttling signal to the circuit of the charging device, wherein the throttling signal causes the circuit to reduce an amount of EMI generated.

2. The method of claim 1, wherein the charging device includes an auxiliary power supply comprising an accessory battery and a charging circuit coupled to the accessory battery, and the charging device is configured to provide a charging current.

3. The method of claim 1, further comprising:
when the QOS of the wireless communication is equal to or greater than the threshold QOS and the SOC of the battery is below the threshold SOC:
causing the charging circuit to enter or return to an active charging state for charging the battery of the mobile device.

4. The method of claim 1, wherein QOS is measured in decibels or decibel-milliwatts.

5. A mobile device, comprising:
a wireless circuit;
a processor; and
a memory configured to store instructions that when executed by the processor cause the mobile device to perform steps that include:
determining signal quality of a wireless communication conducted by the wireless circuit, wherein the wireless communication comprises a phone call or cellular data transmission;
determining a state of charge (SOC) of a battery of the mobile device; and
limiting an activity of a charging device communicatively coupled to the mobile device when the SOC of the battery is at or above a low-charge threshold SOC and the signal quality is at or below a signal quality threshold, wherein limiting the activity reduces electromagnetic interference resulting from the activity.

6. The mobile device of claim 5, wherein the charging device is internal or external to the mobile device, and the activity corresponds to sending a charging current.

7. The mobile device of claim 5, wherein a degree by which the activity is limited is based on a mode in which the mobile device is operating.

8. The mobile device of claim 5, wherein the steps further include:
selecting the charging device from a list of accessory devices to limit, wherein the list of accessory devices includes multiple accessory devices capable of causing electromagnetic interferences with the wireless communication.

9. The mobile device of claim 5, wherein limiting the activity includes limiting a current or a voltage supplied to or transmitted from the charging device.

10. The mobile device of claim 5, wherein the charging device includes an auxiliary battery, the mobile device is a mobile phone, and limiting the activity causes a reduction in current supplied from the auxiliary battery to a battery of the mobile phone.

11. The mobile device of claim 5, wherein the steps further include calculating a received signal strength indicator as a basis for signal quality of the wireless communication.

12. A computing device, comprising:
a processor; and
a memory configured to store instructions that when executed by the processor cause the computing device to perform steps that include:
determining a signal quality of a wireless communication comprising a phone call or cellular data transmission;
determining a state of charge of a battery of the computing device; and
when the state of charge of the battery is at or above a threshold state of charge and the signal quality is below a signal quality threshold:
limiting an activity of a charging accessory communicatively coupled to the computing device, wherein limiting the activity reduces interference between the charging accessory and the wireless communication.

13. The computing device of claim 12, wherein the wireless communication corresponds to a voice call or a data transfer.

14. The computing device of claim 12, wherein limiting the activity of the charging accessory includes restricting a charging current being transmitted from the charging accessory to the computing device.

15. The computing device of claim 12, wherein limiting the activity of the charging accessory includes stopping a charging current from being transmitted from the charging accessory to the computing device.

16. The computing device of claim 12, wherein the signal quality is based on one or more quality of service metrics.

17. The computing device of claim 12, wherein the steps further include:
determining, based on a lookup table stored in the memory, a correlation between the signal quality and a limit to be applied to the activity of the charging accessory; and
limiting the activity of the charging accessory based on the limit.

18. The computing device of claim 12, wherein limiting the activity of the charging accessory includes accessing a hierarchy of devices to determine an order of one or more limits to be applied to one or more devices listed in the hierarchy of devices.

19. The method of claim 12, wherein the threshold state of charge is a low-battery charge threshold.

* * * * *